(12) United States Patent
Kondo et al.

(10) Patent No.: US 8,594,192 B2
(45) Date of Patent: Nov. 26, 2013

(54) IMAGE PROCESSING APPARATUS

(75) Inventors: Masatoshi Kondo, Kodaira (JP); Yuichi Onami, Iruma (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1994 days.

(21) Appl. No.: 11/512,190

(22) Filed: Aug. 30, 2006

(65) Prior Publication Data

US 2007/0053432 A1     Mar. 8, 2007

(30) Foreign Application Priority Data

Sep. 28, 2005    (JP) .................................. 2005-282501

(51) Int. Cl.
*H04N 7/12*     (2006.01)
(52) U.S. Cl.
USPC ............................... 375/240.12; 375/240.16
(58) Field of Classification Search
USPC ...................... 375/240.12, 240.16; 382/240
See application file for complete search history.

(56) References Cited

U.S. PATENT DOCUMENTS

| | | | | |
|---|---|---|---|---|
| 6,031,940 | A | * | 2/2000 | Chui et al. .................... 382/240 |
| 2004/0013202 | A1 | * | 1/2004 | Lainema .................... 375/240.18 |
| 2004/0233989 | A1 | * | 11/2004 | Kobayashi et al. ...... 375/240.16 |
| 2005/0163216 | A1 | * | 7/2005 | Boon et al. ............... 375/240.12 |

FOREIGN PATENT DOCUMENTS

| | | | | |
|---|---|---|---|---|
| GB | EP 0725363 | * | 7/1996 | ................ G06T 9/00 |
| JP | 08-242446 | | 9/1996 | |
| JP | 2005318497 | | 11/2005 | |
| KR | 20000015558 | | 3/2000 | |
| KR | 20050067083 | | 6/2005 | |

\* cited by examiner

*Primary Examiner* — Anner Holder
(74) *Attorney, Agent, or Firm* — Brundidge & Stanger, P.C.

(57) ABSTRACT

An image processing apparatus for encoding or decoding an image, wherein, even when it is desired to process a motion picture having, e.g., a high resolution, the capacity of a memory necessary for storing a predictive frame is reduced. In an image processing device such as an image encoding or decoding device for encoding or decoding an image, the processing device encodes or decodes the image in an intra-child-frame correlation system or in an inter-child-frame correlation system. In the system, a frame of the image to be processed is treated as a parent frame, the parent frame is divided into a plurality of child frames, and an intra-child-frame correlation or an inter-child-frame correlation is used for each child frame.

5 Claims, 8 Drawing Sheets

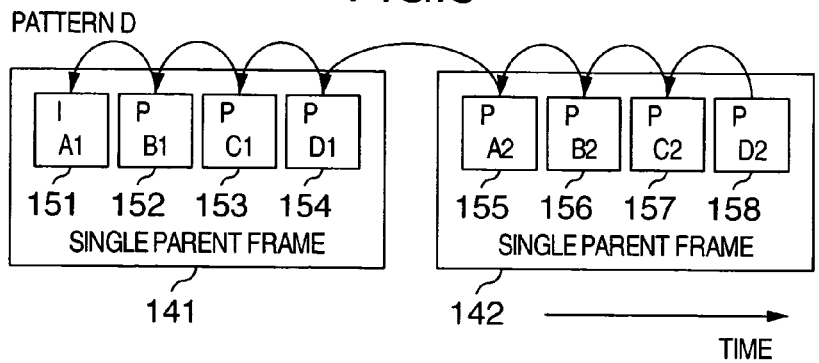
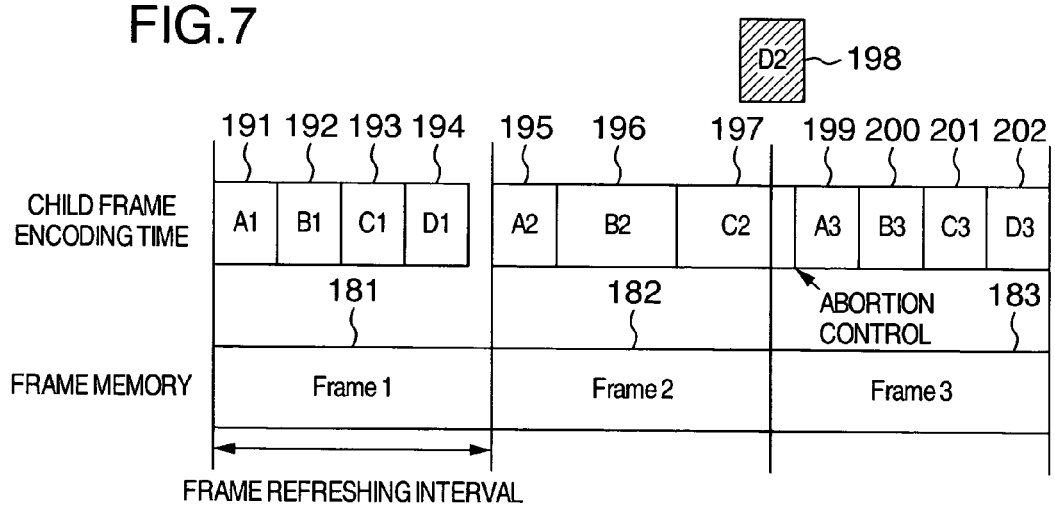
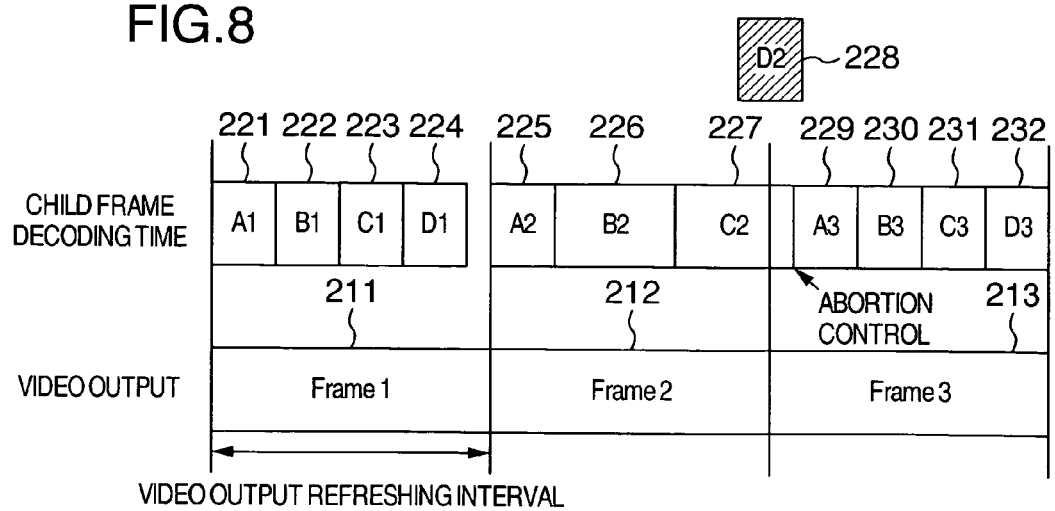

IMAGE PROCESSING APPARATUS

INCORPORATION BY REFERENCE

The present application claims priority from Japanese application JP2005-282501 filed on Sep. 28, 2005, the content of which is hereby incorporated by reference into this application.

BACKGROUND OF THE INVENTION

The present invention relates to image processing apparatuses such as image encoding devices or image decoding devices which process an image in a predictive coding system which performs coding operation based on a correlation between frames, and more particularly, to an image processing apparatus which, even when processing a motion picture, e.g., having a high resolution, can reduce the capacity of a memory required for storing a predicting frame.

For example, there is already known an image transmission system in which an image encoding device compresses and encodes an image and transmits the compressed/encoded image, and an image decoding device receives the compressed/encoded image and decodes it.

In compressing data about a motion picture of successive frames, its compression efficiency is increased by compressing the data based on a correlation between frames preceding and subsequent to one of the successive frames. As such a predictive coding system as to utilize the preceding/subsequent frame correlation, MPEG (Moving Picture Experts Group)-2 MPEG-4 is well known.

FIG. 14 shows an example of a related art image transmission system.

The image transmission system of this example includes an image encoding device 381 for compressing data by utilizing a correlation between frames preceding and subsequent to one of frames of a motion picture, and also includes an image decoding device 382 for decoding an encoded stream into a reproducible image data. The image encoding device 381 and the image decoding device 382 are interconnected by a network 383.

In the image encoding device 381, an A/D converter 392 receives a video signal issued from a video input device 391 such as a camera and converts the received signal to digital image data. The digital image data issued from the A/D converter 392 is stored in a frame memory 393. For example, the frame memory 393 divides a frame into square blocks of 16×16 called macro blocks in MPEG-4 or AVC (Advanced Video Coding), and then outputs the divided macro blocks to an encoder 394 on a macroblock-by-macroblock basis.

When a predictive frame is stored in a predictive frame memory 396, the encoder 394 performs encoding operation based on a correlation between preceding and subsequent frames. When a predictive frame is not stored in the memory, the encoder 394 performs encoding operation based on a correlation between adjacent pixels in a frame. Even when the predictive frame is stored in the memory, the encoder 394 can perform the intra-frame correlation encoding operation.

The encoder 394, after receiving data to be encoded, performs predetermined encoding operation in the aforementioned manner and outputs the encoded stream to a stream buffer 397. A decoder 395, when receiving the encoded stream, decodes the encoded data into decoded image data and stores the decoded data in the predictive frame memory 396.

The stream buffer 397, when receiving the encoded stream, outputs the encoded stream to a communication controller 398. The communication controller 398 transmits the encoded stream to the image decoding device 382 via the network 383 by a predetermined communication procedure such as TCP/IP.

In the image decoding device 382, a communication controller 401 receives the encoded stream from the image encoding device 381 and outputs the received encoded stream to a stream buffer 402. The stream buffer 402 outputs the encoded stream to a decoder 403. The decoder 403 decodes the received encoded stream into decoded image data, and stores the data in a memory 405. The decoder ¥403 also stores the decoded data in a predictive frame memory 404. When the frame to be decoded is already encoded by the predictive coding, the decoder 403 decodes the frame with use of predictive frame data stored in the predictive frame memory 404.

Image data issued from the memory 405 for receiving the decoded image data is converted by a D/A converter 406 to an analog signal. The analog signal is reproduced by a video output device 407 such as a monitor.

As one of such related arts, JP-A-8-242446 is proposed.

Such an image encoding device 381 and an image decoding device 382 based on the predictive coding system as shown in FIG. 14 require the predictive frame memories 396 and 404, and the necessary sizes of such memories depends on the number of pixels in a motion picture and on the number of frames to be stored for prediction.

In these years, however, as the performance of an imaging element is made high, an increasing number of motion pictures have very high resolutions exceeding 1,000,000 pixels as in a HDTV (High Definition TeleVision). The resolutions of even motion pictures to be encoded by the image encoding device 381 are correspondingly made increasingly higher. This involves a problem with the increased necessary capacity of the predictive frame memories 396 and 404.

SUMMARY OF THE INVENTION

In view of the aforementioned circumstances in the prior art, it is therefore an object of the present invention to provide and an image processing apparatus including an image encoding device and/or an image decoding device, which, even when it is desired to process a motion picture having, e.g., a high resolution by a predictive coding system based on a correlation between frames, can reduce the capacity of a memory necessary for storing predictive frames.

The above object is attained by providing an image processing apparatus of the present invention, which is arranged as follows for image encoding or decoding.

That is, when it is assumed that a frame of an image to be processed is a parent frame and one of a plurality of sub-frames, into which the parent frame is divided, is a child frame; the image processing apparatus encodes or decodes an image in a system based on a correlation in child frames or based on a correlation between child frames.

Accordingly, since the image encoding or decoding is carried out in units of child frame, the necessary quantity of data to be stored as a reference frame can be reduced to a small level corresponding to the child frames in the system using the correlation between child frames. As a result, even when it is desired to process a motion picture having, e.g., a high resolution in the predictive coding system based on a correlation between frames, the capacity of the memory necessary for storing the predictive frame can be made small.

The image processing apparatus can be arranged, for example, as an image encoding device for encoding an image, as an image decoding device for decoding an image, or as a device having the both functions thereof.

As an image to be processed, a motion picture including, e.g., a plurality of successive frames is used in this example, but a still image may be used.

The number of a plurality of child frames generated by dividing a single parent frame may be arbitrarily set.

Further, the manner, by which a parent frame is divided into a plurality of child frames, may be modified in various ways. It is preferable to distribute pixels in the parent frame to a plurality of child frames, for example, so as to include pixels of the parent frame at adjacent pixel positions in a plurality of child frames, thus increasing a correlation between the plurality of generated child frames.

As a child-frame encoding method, for example, predetermined some of child frames are encoded in a scheme based on a correlation in the predetermined child frames, and other child frames are encoded in a scheme based on other predetermined child frames as a reference frame and in a scheme based on a correlation between the other predetermined child frames.

As the intra-child-frame correlation, for example, a correlation between the values of pixels at adjacent pixel positions in the same child frame may be used.

Further, as the inter-child-frame correlation, for example, a correlation between the values of pixels at corresponding positions in different child frames may be used.

As the child-frame decoding method, a scheme compatible with the child-frame encoding scheme may be used.

The image processing apparatus of the present invention is arranged as follows as an example.

That is, the processing apparatus, when it is desired to process a plurality of successive parent frames, employs such a system that a correlation between child frames is used and one of a plurality of child frames of a predetermined parent frame to be first processed is used as a reference frame.

Accordingly, as in a pattern A shown in FIG. 3 or as in a pattern C shown in FIG. 4 for example; when one of child frames of a parent frame to be first processed is used as a reference frame, such a situation that generation of an abnormality in a reference frame disables the encoding or decoding of the other child frames, can be suppressed.

As the child frame of the reference frame, for example, another child frame belonging to a parent frame, to which the child frame also belongs, may be used, or a child frame belong to another parent frame may be used.

The image processing apparatus, when it is desired to process a plurality of successive parent frames, employs such a system that a correlation between child frames is used and a correlation between child frames independent for each parent frame is used.

Accordingly, as in a pattern B shown in FIG. 3 for example, when a correlation between child frames independent for each parent frame is used, such a situation that even occurrence of an abnormality in a reference frame belonging to a parent frame disables the encoding or decoding of child frames belonging to the other parent frames, can be prevented.

The image processing apparatus of the present invention is arranged as follows as an example.

That is, the above processing apparatus generates an average image frame of a plurality of child frames belonging to a parent frame of an image to be processed, regards the average image frame as a child frame, employs the intra-child-frame correlation scheme for the average image frame, and employs the inter-child-frame correlation scheme for the other child frames, with the average image frame or a frame antecedent thereto by one being used as a reference frame.

Accordingly, with respect to a plurality of child frames generated from a parent frame, an average image frame of these child frames or a frame antecedent thereto by one is used as a reference frame, and the other child frames are encoded or decoded. Therefore, a correlation between the reference frame and the child frames can be increased and an encoding efficiency in the inter-frame correlation can be increased. Further, when the average image frame is used, a correlation in frames can be increased. Thus the encoding efficiency in the intra-frame correlation can be increased.

With regard to a plurality of child frames generated from a parent frame, even when an average image frame is used and one of these child frames is not encoded nor decoded, the child frame can be decoded from the other child frames (including the average image frame).

With respect to the average image frame of a plurality of child frames, various types of averaging methods may be employed. For example, with regard to a plurality of child frames having the same positions (in vertical and horizontal directions) of height and width, a frame made of an average of the values of pixels at the positions can be used.

The image processing apparatus of the present invention is arranged as follows, as an example.

That is, the image processing apparatus, when it is desired to encode an image, performs encoding operation by further dividing one or more of a plurality of frames generated by dividing one frame and repeating the dividing operation once or a plurality of times to generate frames smaller in size than the child frame.

Accordingly, frames having smaller in size than the parent and child frames may be generated.

The image processing apparatus, when it is desired to decode an image, performs decoding operation only frames having sizes not larger than a predetermine value.

Accordingly, in the case where parent and child frames and frames of sizes smaller therethan are present, when the apparatus decodes only frames of necessary sizes, a decoding efficiency can be enhanced. As an example, when various sizes of frames are generated and encoded by the image encoding device, the frames are decoded by a plurality of image decoding devices into frames of sizes suitable for their own devices, and when frames of sizes larger than the suitable sizes of the own devices are not decoded; a processing efficiency can be increased.

When at least one of a plurality of frames generated by dividing a single frame is further divided, frames smaller in size than the original frame can be generated.

Further, a frequency of repetitively dividing a frame may be set at an arbitrary value.

An image processing system according to the present invention is arranged as follows, so that an image is encoded by an image encoding device and the encoded image is decoded by an image decoding device.

In the image encoding device, more specifically, an encoder input device inputs an image to be processed. A divider treats a frame of the image inputted from the encoder input device as a parent frame, and divides the parent frame into a plurality of frames as child frames. The image encoding device encodes each of the child frames generated by the divider in a system using a correlation in child frames or using a correlation between child frames. An encoder memory stores a reference frame when the correlation between child frames is used. An encoder output device outputs the image encoded by the encoder.

In the image decoding device, a decoder input device inputs the encoded image. On the basis of the encoded image inputted from the decoder input device, a decoder decodes the child frames in a system compatible with the above encoding system. A decoder memory stores the reference frame when the correlation between child frames is used. A linker links child frames decoded by the decoder to generate a parent frame. A decoder output unit outputs an image of the parent frame generated by the linker.

Accordingly, when compared with the case where a parent frame is used as a reference frame to be referred to as the correlation party when a correlation between child frames is used to encode or decode the child frames, the size of the reference frame can be made smaller due to the use of the child frames, and the capacity of the memory necessary for storing the reference frame in the image encoding or decoding device can be made smaller.

The encoder or decoder storage may be formed, for example, as a memory.

As a device for inputting an image, for example, a device for inputting an image by photographing and acquiring data about the image or a device for inputting image data issued from another device may be employed.

As a device for outputting an image, for example, a device for outputting and displaying an image or a device for outputting image data to another device may be employed.

The image transfer between the image encoding and decoding devices may be realized by transmitting the encoded image via the network or by shifting the encoded image in the form of a recording medium having the image recorded therein.

In this connection, the present invention may be provided in the form of a method, a program, or a recording medium.

In the method of the present invention, various sorts of processing operations in the method are implemented by the respective units of the apparatus.

In the program of the present invention, the program is executed by a computer forming the apparatus. In other words, various sorts of functions in the program are implemented by the computer.

In the recording medium of the present invention, the program for causing the computer of the apparatus to execute is recorded in the recording medium to be read from the medium by an input unit of the computer. The program is executed by the computer to realize various sorts of processing operations.

As has been explained above, in accordance with the image processing apparatus of the present invention, a frame of an image to be processed is treated as a parent frame, the parent frame is divided into a plurality of subframes as child frames, and the child frames of the image are encoded or decoded in a system using a correlation in the child frames or using a correlation between the child frames. Thus, in the system using the correlation between the child frames, the quantity of data to be stored as a reference frame can be made small.

Other objects, features and advantages of the invention will become apparent from the following description of the embodiments of the invention taken in conjunction with the accompanying drawings.

BRIEF DESCRIPTION OF THE DRAWINGS

FIG. 5 shows yet another example of the frame encoding sequence;

FIG. 7 shows an example of an encoding control system;

FIG. 8 shows an example of a decoding control system;

DESCRIPTION OF THE EMBODIMENTS

Embodiments of the present invention will be explained with reference to the accompanying drawings.

In this specification, encoding using a correlation between frames is called predictive coding system. In the predictive coding system, with respect to a motion picture, in particular, having successive frames, a high correlation between one of the frames to be encoded and frames before and after the encoding target frame is utilized to predict pixel information about the corresponding frame from the frames before and after the target frame. By such coding, image information can be compressed.

A frame encoded by using the inter-frame correlation will be referred to as the P (Prediction) frame; and a frame encoded by using only the pixel correlation in the frame will be referred to as the I (Intra) frame. The concept of these I and P frames is similar to the concept of I and P generally used in specifications of MPEG-2 or MPEG-4.

In the embodiment, an original frame as a division source will be referred to as a parent frame; whereas, frames, into which the parent frame is divided, will be referred to as child frames. Subframes, into which the child frame is divided, will be referred to as grandchild frames, and so on.

Embodiment 1

A first embodiment of the present invention will be explained.

Figure 1:
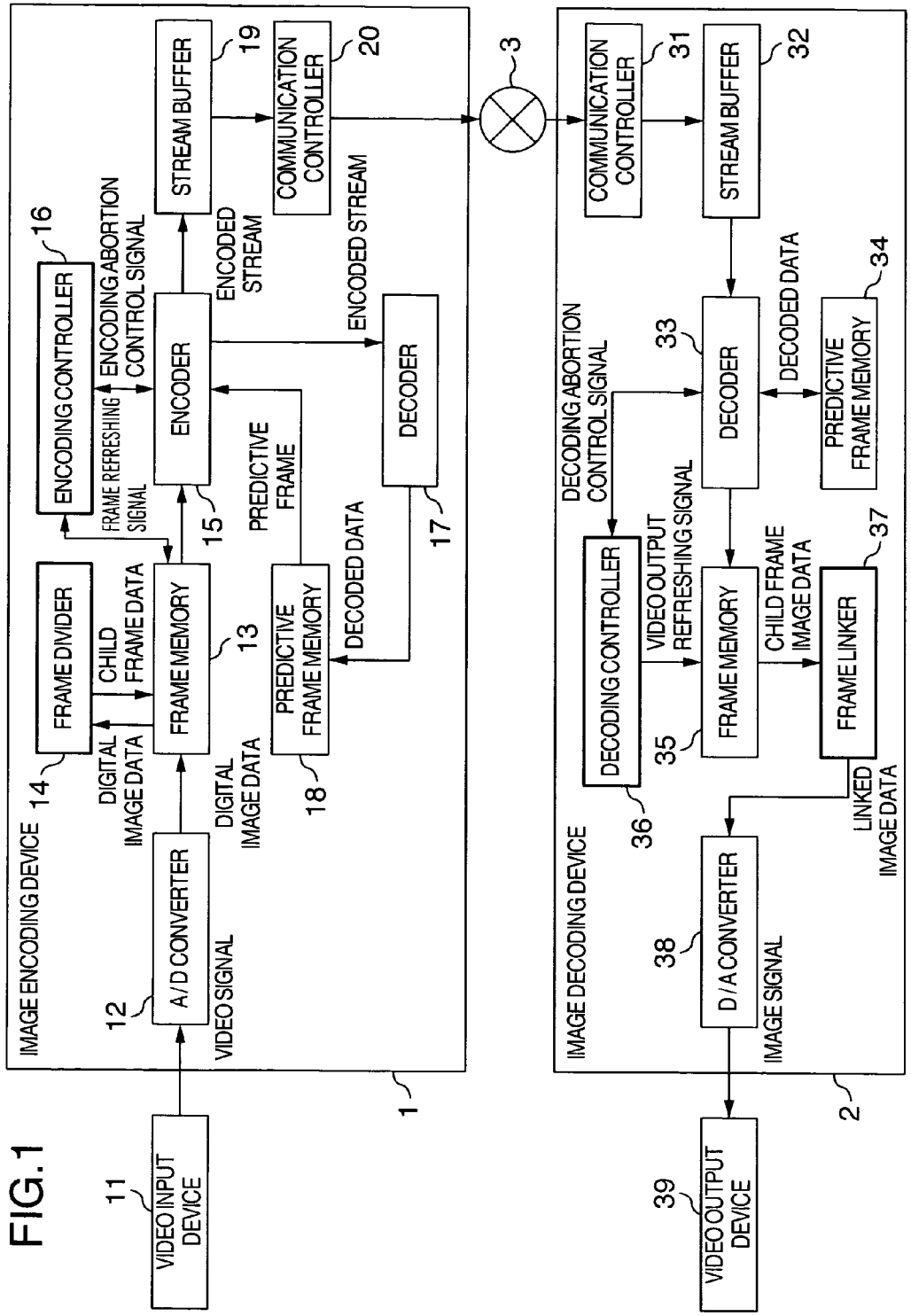
FIG. 1 shows an example of an arrangement of an image transmission system in accordance with a first embodiment of the present invention.

FIG. 1 shows an example of an image transmission system in accordance with an embodiment of the present invention.

The image transmission system of the present embodiment includes an image encoding device 1 connected with a video input device 11 and an image decoding device 2 connected to a video output device 39. The image encoding device 1 and the image decoding device 2 are connected by a network 3.

The image encoding device 1 in the present embodiment has an A/D (Analog to Digital) converter 12, a frame memory 13, a frame divider 14, an encoder 15, an encoding controller 16, a decoder 17, a predictive frame memory 18, a stream buffer 19, and a communication controller 20.

The image decoding device 2 in the present embodiment has a communication controller 31, a stream buffer 32, a decoder 33, a predictive frame memory 34, a frame memory 35, a decoding controller 36, a frame linker 37, and a D/A (Digital to Analog) converter 38.

The operation of the image encoding device 1 in the present embodiment will be briefly explained.

A video is photographed by the video input device 11 such as a camera and a video signal (image signal) is acquired. In the image encoding device 1, a video signal issued from the video input device 11 is applied to the A/D converter 12, which in turn converts the received video signal to digital image data. The A/D converter 12 outputs the digital image data to the frame memory 13 to store the data therein. The frame memory 13, when receiving the digital image data, outputs the digital image data to the frame divider 14. The frame divider 14, when receiving the digital image data, divides a parent frame into child frames according to a predetermined scheme. Data on the divided child frames is stored again in the frame memory 13 so that each of the child frames is encoded by the encoder 15.

When a predictive frame is stored in the predictive frame memory 18, the encoder 15 performs predictive coding operation. When the predictive frame is not stored in the memory (for example, at the beginning of starting the encoding operation), the encoder 15 performs encoding operation based on a correlation between adjacent pixels in a frame. The encoder 15 after having performed the encoding operation outputs the encoded stream to the stream buffer 19. The encoder 15 also outputs the encoded stream to the decoder 17. The decoder 17 when receiving the encoded stream decodes the encoded data into decoded data and stores the decoded data in the predictive frame memory 18.

The encoding controller 16 mainly controls abortion of the encoding operation according to the situation of the encoding operation by the encoder 15.

The stream buffer 19 when receiving the encoded stream outputs the encoded stream to the communication controller 20. The communication controller 20 transmits the encoded stream to the image decoding device 2 via the network 3 according to a predetermined communication procedure such as TCP/IP.

The operation of the image decoding device 2 in the present embodiment will be briefly explained.

In the image decoding device 2, the communication controller 31 receives the encoded stream from the image encoding device 1 via the network 3, and outputs the received encoded stream to the stream buffer 32. The stream buffer 32 outputs the received encoded stream to the decoder 33. The decoder 33 decodes the received encoded stream into decoded image data and stores the decoded data in the frame memory 35. The decoder 33 also stores the decoded data in the predictive frame memory 34. When the frame to be decoded is already encoded by predictive coding, the decoder 33 performs decoding operation with use of predictive frame data stored in the predictive frame memory 34.

The decoding controller 36 mainly controls the abortion of the decoding operation according to the situation of the decoding operation carried out by the decoder 33.

When all the child frames of the frame in question are stored in the frame memory 35, the frame memory 35 outputs image data about the child frames to the frame linker 37. The frame linker 37 when receiving the image data of the child frames links the child frames in a predetermined scheme and the linked image data to the D/A converter 38. The image data is converted to an analog signal by the D/A converter 38, and a video signal converted to the analog signal is output to the video output device 39.

The video signal is reproduced by the video output device 39 such as a monitor.

The encoding and decoding operations of the present embodiment will be explained in detail.

Explanation will first be made as to the encoding operation.

Figure 2:
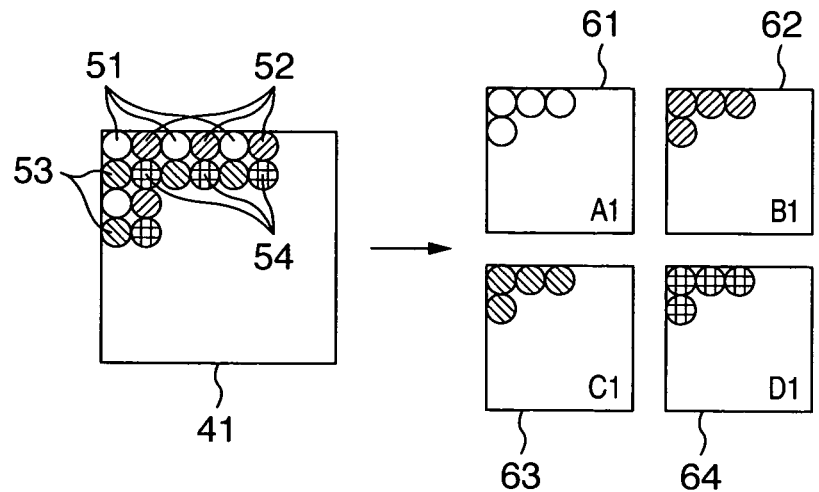
FIG. 2 shows an example of a frame division system.

FIG. 2 shows an example of a scheme of dividing a frame by the frame divider 14.

In this example, one 41 of parent frames forming a motion picture is divided into 4 child frames 61, 62, 63, and 64.

In FIG. 2, reference numeral 51 denotes pixel positions ($2n-1$, $2m-1$) in the parent frame 41. Numeral 52 denotes pixel positions ($2n$, $2m-1$) in the parent frame 41. 53 denotes pixel positions ($2n-1$, $2m$) in the parent frame 41. 54 denotes pixel positions ($2n$, $2m$) in the parent frame 41.

In this example, symbols 'n' and 'm' denotes integers of 1 or higher respectively, and the pixel position is shown by a coordinate point having a pixel position in a width direction and having a pixel position in a height direction. More specifically, the parent frame 41 has a width W and a height H, $n=1, 2, 3, \ldots$, and $W/2$, and $m=1, 2, 3, \ldots$, and $H/2$.

In the frame division scheme or system of this example, the parent frame is divided into 4 child frames 61 to 64 corresponding to the respective pixel positions 51 to 54. In other words, in the respective child frames 61 to 64, pixels at the respective pixel positions 51 to 54 are arranged to keep positional relations of up/down and left/right.

In general, an natural image has a strong correlation between adjacent pixels therein, and the higher the resolution is the stronger the correlation with adjacent pixels is as an tendency. Thus, in the system of this example, when the parent frame is divided, the divided child frames 61 to 64 have a high mutual similarity and a strong correlation. In this example, by utilizing such a strong correlation between the child frames 61 to 64, encoding operation, e.g., similar to the prior art predictive coding system is applied to the mutual child frames 61 to 64. In this case, the predictive frame memories 18 and 34 are required to have a memory size corresponding to the child frames.

In this example, accordingly, when encoding and decoding operations are carried out for each child frame, the required capacity of the predictive frame memory 18 or 34 can be reduced by an amount corresponding to one child frame. In this way, in the prior art, the predictive frame memory 18 or 34 has been required to have a memory size corresponding to one parent frame. In this example, however, the memory size can be reduced to ¼ of one parent frame or to one child frame, and thus the required capacity of the predictive frame memories 18 and 34 can be saved.

FIGS. 3A, 3B, 4, and 5 show examples of a sequence of encoding a child frame when 2 or more successive parent frames are encoded.

Figure 3A:
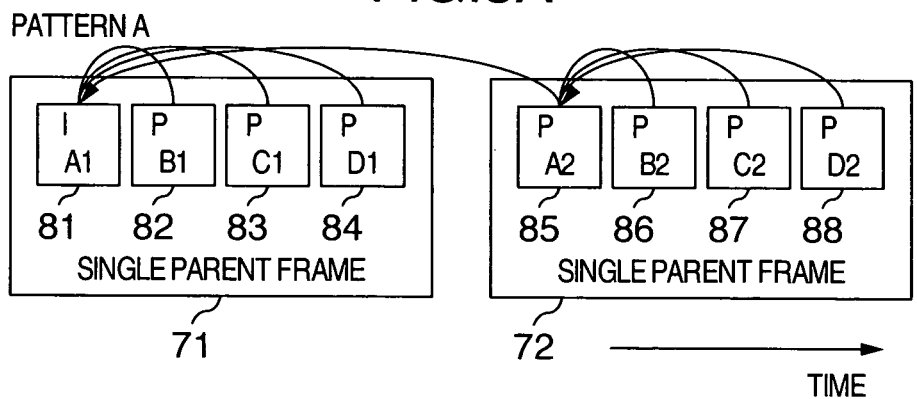
FIG. 3A shows an example of a frame encoding sequence.
Figure 3B:
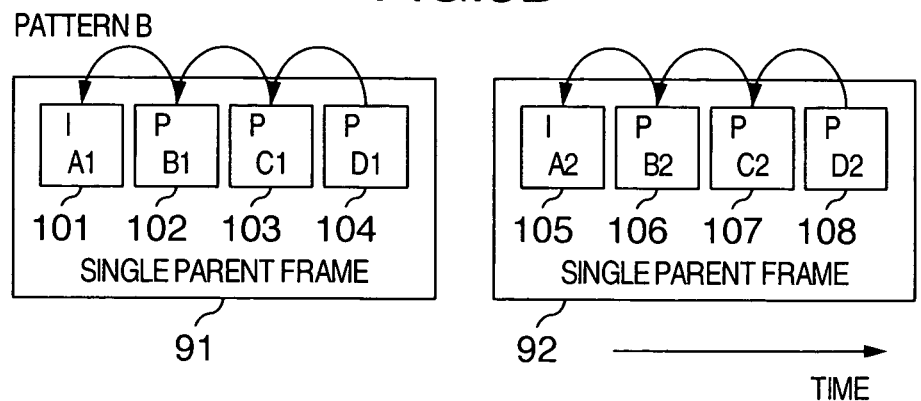
FIG. 3B shows another example of the frame encoding sequence.
Figure 4:
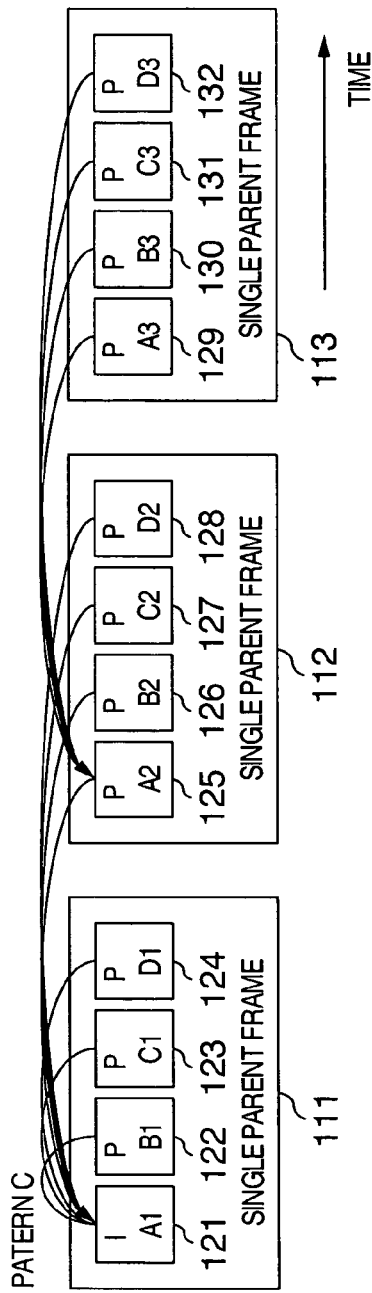
FIG. 4 shows a further example of the frame encoding sequence.

As the frame encoding sequence, patterns A and B are shown in FIGS. 3A and 3B respectively, and a pattern C is shown in FIG. 4. In this example, any of the 3 patterns A, B, and C is set to be fixed or variable.

A pattern D is shown in FIG. 5. In this example, the patterns A, B, and C are more preferable than the pattern D. Thus the patterns A, B, and C are used but the pattern D may also be used.

FIG. 3A relating to the pattern A shows one parent frame 71, 4 child frames 81 to 84 generated from the parent frame 71, one parent frame 72 subsequent to the parent frame 71, and 4 child frames 85 to 88 generated from the parent frame 72. An arrow points a frame as a prediction reference destination (prediction destination).

In this example, with respect to the 2 parent frames 71 and 72 (or 3 or more parent frames), the first child frame 81 is encoded based on the pixel correlation within the parent frame 71 to form an I frame. The 7 (or more) child frames 82 to 88 following the child frame 81 are encoded based on the correlation between the child frames, forming P frames.

The prediction destination of a P frame as the first child frame in the parent frame 72 is first one of the child frames in the previous parent frame 71. The prediction destination of P frames as the second and subsequent child frames in the parent frame 72 is first one of the encoded child frame of the parent frame 72. More specifically, the second, third, and fourth child frames 82, 83, and 84 included in the parent frame 71 and the first child frame included in the parent frame 72 are encoded based on the correlation with the first child frame 81 included in the parent frame 71. The second, third, and fourth child frames 86, 87, and 88 included in the parent frame 72 are encoded based on the correlation with the first child frame 85 included in the parent frame 72.

FIG. 3B relating to the pattern B shows one parent frame 91, 4 child frames 101 to 104 generated from the parent frame 91, a parent frame 92 subsequent to the parent frame 91, and 4 child frames 105 to 108 generated from the parent frame 92. An arrow points a frame as a prediction reference destination (prediction destination).

In this example, with regard to the parent frames 91 and 92, the first child frames 101 and 105 in the respective parent frames 91 and 92 are encoded based on based on the pixel correlation in the parent frames to form I frames respectively. Three child frames 102 to 104 and 106 to 108 subsequent to the first child frames 101 and 105 are encoded based on the correlation between the child frames to form P frames respectively.

In this way, the first encoded child frames 101 and 105 of the respective child frames belonging to the respective parent frames 91 and 92 are encoded to form I frames respectively.

The prediction destination of each of the P frames is the child frame encoded previously by one frame. More specifically, the child frames 102 to 104 as the P frames are encoded based on the correlation with the child frames 101 to 103 encoded previously by one frame respectively. The child frames 106 to 108 as the P frames are encoded based on the correlation with the child frames 105 to 107 encoded previously by one frame respectively.

As another pattern example, the second and subsequent child frames 102 to 104 and 106 to 108 in the respective parent frames 91 and 92 may be encoded based on the correlation with the first encoded child frames 101 and 105 respectively, and the first encoded child frames 101 and 105 may be the prediction destinations respectively. In this example, any pattern may be employed.

FIG. 4 relating to the pattern C shows one parent frame 111, 4 child frames 121 to 124 generated from the parent frame 111, one parent frame 112 subsequent to the parent frame 111, 4 child frames 125 to 128 generated from the parent frame 112, one parent frame 113 subsequent to the parent frame 112, and 4 child frames 129 to 132 generated from the parent frame 113. An arrow points a frame as a prediction reference destination (prediction destination).

In this example, with respect the 3 parent frames 111, 112, and 113 (or 4 or more parent frames), the first child frame 121 is encoded based on the pixel correlation in the frame to form an I frame, and the subsequent 11 (or more) child frames 122 to 132 are encoded based on the correlation with the child frames to form P frames respectively.

With regard to the parent frame 111 having the I frame, the second and subsequent child frames 122 to 124 are encoded based on the correlation with the first encoded child frame 121, and have the first encoded child frame 121 as their prediction destination. The child frames 125 to 128 and 129 to 132 belonging to the parent frames 112 and 113 not having the I frame have the first encoded child frames 121 and 125 of the one-frame-previous parent frames 111 and 112 as their prediction destinations respectively. More specifically, the child frames 125 to 128 are encoded based on the correlation with the child frame 121 respectively, and the child frames 129 to 132 are encoded based on the correlation with the child frame 125 respectively.

FIG. 5 relating to the pattern D shows one parent frame 141, 4 child frames 151 to 154 generated from the parent frame 141, one parent frame 142 subsequent to the parent frame 141, and 4 child frames 155 to 158 generated from the parent frame 142. An arrow points a frame as a prediction reference destination (prediction destination). In this example, with respect to the 2 parent frames 141 and 142 (or 3 or more parent frames), the first child frame 151 is first encoded based on the pixel correlation within the parent frame to form an I frame. The 7 (or more) child frames 152 to 158 subsequent to the child frame 151 are encoded based on the child frames to form P frames respectively.

As the prediction destination of each P frame, the child frame encoded previously by one frame is used. More specifically, the child frames 152 to 158 as the P frames are encoded based on the correlation with corresponding one of the child frames 151 to 157 encoded previously by one frame.

Figure 6:
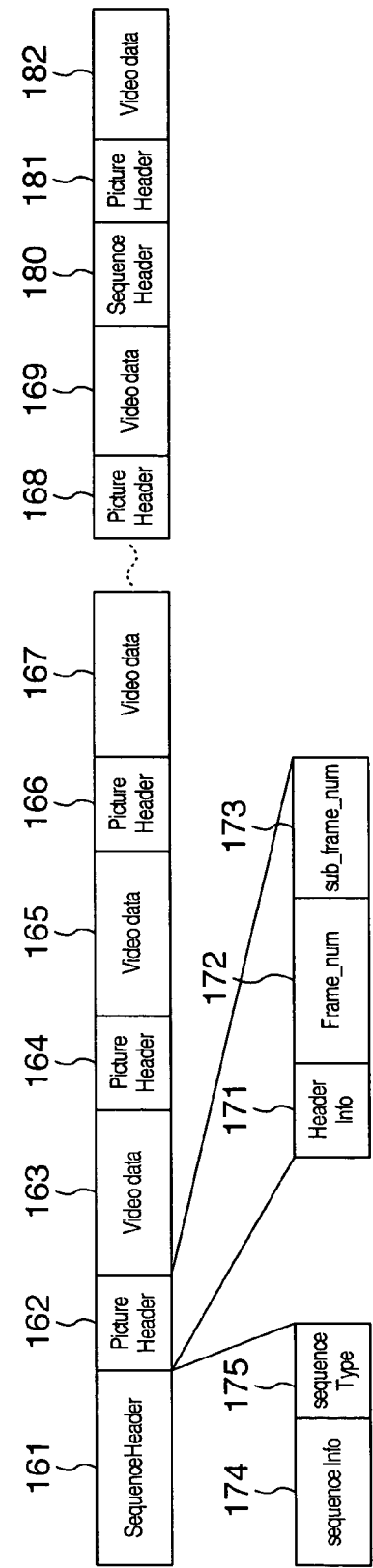
FIG. 6 shows an example of an internal structure of an encoded stream.

FIG. 6 shows an example of a data syntax as the internal structure of an encoded stream.

In the encoded stream of this example, header information (sequence header) 161 about the entire stream is followed by sets of header information (picture headers) 162, 164, 166, and 168 about respective child frames and encoded image data (video data) 163, 165, 167, and 169 respectively, corresponding to 4 frames. Similarly, the next header information (sequence header) 180 is followed by header information (picture header) 181 for a child frame and encoded image data (video data) 182.

The header information (sequence header) 161 on the entire stream has sequence information (sequence info) 174 and information (sequence type) 175 specifying the type of a predictive pattern. The information 175 specifying the type of a predictive pattern can be expressed by 2 bits for the patterns A, B, C, and D, and by 1 bit for the restricted patterns A and B.

The header information 162, 164, 166, and 168 for the respective child frames have predetermined header information (Header info) 171, frame number information (Frame_num) 172 indicative of the serial number of the parent frame expressed by an arbitrary number of bits, and child frame number information (sub_frame_num) 173 indicative of a child frame number as child frame identification information expressed by 2 bits respectively.

In this case, the header information 161 on the entire stream includes information such as a parameter necessary for the decoding of the entire stream.

The header information 162, 164, 166, 168, 181 on the respective child frames include parameter necessary for decoding the corresponding child frames.

The encoded image data 163, 165, 167, 169, 182 on the respective child frames are data obtained by encoding the image data of the respective child frames.

In this example, the header information 161 of the entire stream includes, in addition to information (Sequence Info) 174 similar to header information used, e.g., in a prior art coding system, the header information (Sequence Type) 175 indicative of a pattern of frame encoding sequence.

In this case, the header information (Sequence Type) 175 indicative of a pattern of frame encoding sequence specifies, for example, "00" when the pattern A is used for the frame encoding sequence, "01" when the pattern B is used, and "10"

when the pattern C is used therefore. If there are two sorts of frame encoding sequences, then the header information can specify "0" or "1".

In this example, the header information 162, 164, 166, 168, 181 about the respective child frames include, in addition to the header information 171 similar to information used, e.g., in a prior art predictive coding system, the frame number information 172 of the parent frame and the frame number information 173 of the child frame respectively. As a result, the child frame can be normally decoded.

In this example, the number specified by the frame number information 172 of the parent frame is a serial number indicative of the order according to which the frame is reproduced in the entire stream. Child frames belonging to the same parent frame have the same information as the frame number information 172 of the parent frame respectively.

On the basis of the frame number information 173 of the child frames, the types of the child frames belonging to the same parent frame can be identified. In this example, one parent frame is divided into 4 child frames, and the frame number information 173 about the child frames have 4 values of 0, 1, 2, and 3. In the example shown in FIG. 2, for example, the frame number information of the child frame 61 has a value of 0, the frame number information of the child frame 62 has a value of 1, the frame number information of the child frame 63 has a value of 2, and the frame number information of the child frame 64 has a value of 3. As a result, the corresponding pixel positions 51 to 54 of the decoded child frames 61 to 64 relative to the parent frame 41 can be identified.

FIG. 7 shows an example of how the encoding controller 16 in the system controls the encoding operation.

In the image encoding device 1 in this apparatus, image data in the frame memory 13 is refreshed at intervals of frame refreshing time as a predetermined time to obtain the latest image data. In this case, it is necessary to terminate the encoding operation of one parent frame, that is, corresponding to 4 child frames within the frame refreshing interval.

In this example, when the encoding controller 16 outputs a frame refreshing signal to the frame memory 13 at intervals of the frame refreshing time, the image data in the frame memory 13 is refreshed for the next data.

In FIG. 7, encoding operations 191 to 194 of 4 child frames generated from the first parent frame 181 has no problem because the encoding operations are already finished within the frame refreshing interval.

With respect to encoding operations 195 to 198 of 4 child frames generated from the next parent frame 182, the frame refreshing interval already expires at the time point when the encoding operation 197 of the third child frame is finished. If the encoding operation 198 of the fourth child frame is further carried out, then this influences the encoding operation 199 of the first child frame of the next parent frame 183 and subsequent operations thereof. To avoid this, the encoding controller 16 of the present system transmits an encoding abortion control signal to the encoder 15 to abort the encoding operation.

The encoder 15, when receiving the encoding abortion control signal, stops the remaining encoding operation 198 of the parent frame 182 being processed, and starts the encoding operations 199 to 202 of the corresponding child frames of the next parent frame 183.

Explanation will next be made as to the decoding operation.

FIG. 8 shows an example of how the decoding controller 36 in the present system controls the decoding operation.

In the image decoding device 2 of the apparatus, it is assumed that image data in the frame memory 35 is refreshed at intervals of a predetermined video output refreshing time to maintain the latest image data. In this case, it is required to finish the decoding operation of one parent frame, that is, corresponding to 4 child frames within the video output refreshing interval.

In this example, when the decoding controller 36 outputs a video output refreshing signal to the frame memory 35 at intervals of the video output refreshing time, image data in the frame memory 35 is refreshed to maintain the next data therein.

As in the encoding controller 16, when the decoding operation of one parent frame cannot be terminated within the refreshing interval or when an encoded stream corresponding to one parent frame cannot reach the image decoding device 2 within the refreshing interval due to some data communication situation between the image encoding device 1 and the image decoding device 2, the decoding controller 36 controls the abortion of the encoding operation.

In FIG. 8, the decoding operations 221 to 224 of 4 child frames of 4 child frames belonging to the first parent frame 211 have no problem because each decoding operation is already terminated within the video output refreshing interval.

The decoding operations 225 to 228 of 4 child frames belonging to the next parent frame 212 exceed the video output refreshing interval at the time point when the decoding operation 227 of the third child frame is finished. If the decoding operation 228 of the fourth child frame is carried out, then this influences the decoding operation 229 of the first child frame of the next parent frame 213 and subsequent decoding operations. To avoid this, the decoding controller 36 of the system transmits a decoding abortion control signal to the decoder 33 to abort the decoding operation.

The decoder 33, when receiving the decoding abortion control signal, stops the remaining decoding operation 228 of the parent frame 212 being then processed and starts the decoding operations 229 to 232 of child frames belonging to the next parent frame 213.

Consideration will now be given to a situation at the time of aborting the decoding operation, with respect to the patterns A and B shown in FIGS. 3A and 3B respectively, the pattern C shown in FIG. 4, and the pattern D shown in FIG. 5.

First of all, when the frame encoding sequence of the pattern D is used, it is required to sequentially decode the encoded stream in the encoded order. Thus, when the decoding operation is controlled to be aborted, the decoding operations of the aborted child frame and subsequent child frames (P frames) are disabled until the next one frame appears.

With respect to the patterns A, B, and C, on the other hand, even occurrence of the abortion control of the decoding operation enables the decoding operations of the subsequent child frames.

When the frame encoding sequence of the pattern A is used, the first child frames 81 and 85 of the parent frames 71 and 72 are the prediction destinations. Therefore, even when the encoding operation or decoding operation is aborted on the way, the subsequent child frames can be processed. With regard to the parent frame 71 for example, even when the decoder 33 decodes the first child frame 81, the decoded image data is stored in the predictive frame memory 34, and thereafter the subsequent decoding operations of the child frames 82, 83, and 84 are aborted; the first child frame 85 of the next parent frame 72 can be normally decoded, because the decoded image data of the child frame 81 as the prediction destination is present in the predictive frame memory 34.

When the frame encoding sequence of the pattern B is used, the first child frames 101 and 105 of the parent frames 91 and 92 are the prediction destinations. Thus, even when the encoding or decoding operation is aborted on the way, the subsequent child frames can be processed. With regard to the pattern B, since the parent frames 91 and 92 can be independently encoded and decoded, random access can be realized.

When the frame encoding sequence of the pattern C is used, the first child frames 121, 125, and 129 of the parent frames 111, 112, and 113 are the prediction destinations. Thus, similarly to the pattern A for example, even when the encoding or decoding operation is aborted on the way, the subsequent child frames can be processed.

Figure 9:
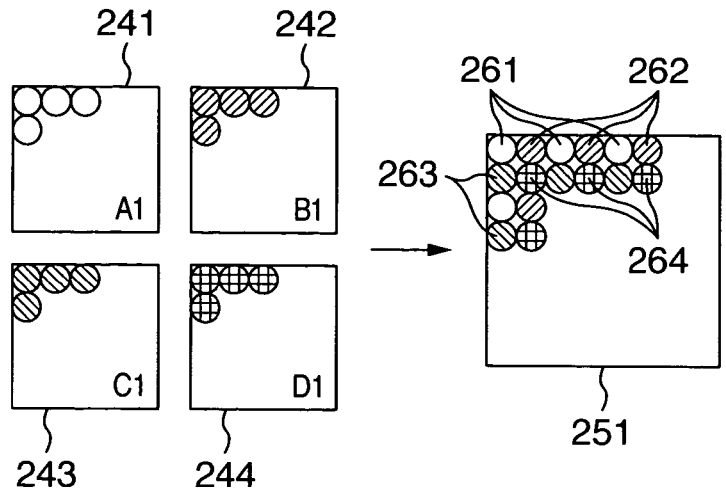
FIG. 9 shows an example of a frame linking system.

FIG. 9 shows an example of a scheme of linking image data of child frames decoded by the frame linker 37.

The frame linking scheme of this example corresponds to the frame division system shown in FIG. 2, but schematically reverses in processing direction.

More specifically, when divided 4 child frames 241 to 244 of a parent frame 251 are normally decoded and stored in the frame memory 35, the child frames 241 to 244 are linked to form a single parent frame 251.

The child frame 241 is a set of pixels in the parent frame 251 at pixel positions 261 expressed by coordinate points $(2n-1, 2m-1)$, the child frame 242 is a set of pixels in the parent frame 251 at pixel positions 262 expressed by coordinate points $(2n, 2m-1)$; and the child frame 244 is a set of pixels in the parent frame 251 at pixel positions 264 expressed by coordinate points $(2n, 2m)$.

With regard to a single parent frame for example, when the number of child frames encoded through the encoding abortion control is less than 4 or when the number of child frames stored in the frame memory 35 through the decoding abortion control is less than 4; the linking operation of the child frames stored in the frame memory 35 similar to that shown in FIG. 9 is carried out and its lacking pixel component is obtained through interpolating operation. As the interpolating method, various sorts of method may be employed. For example, there is used an interpolation method which performs the interpolating operation with use of an average value of adjacent pixels or performs the interpolating operation with use of adjacent pixels.

In this example, since reproduction can be realized while keeping a real time performance, that is, the number of child frames transmitted from the image encoding device 1 can be controlled; the coding quantity can be easily controlled, and a time required until a stream received at the image decoding device 2 is reproduced can be made small only with a small delay.

Although explanation has been made in this example in connection with the case where one parent frame is divided into 4 child frames, the number of divisions is not limited to 4 but may be set at an arbitrary value.

With respect to the patterns A, B, C, and D shown in FIGS. 3A, 3B, 4, and 5, the child frame (A1) 61 of the parent frame shown at an upper left part in FIG. 2 is set as the I frame. In place of it, however, the child frame (B1, C1, or D1) 62, 63, or 64 at another position may be set at the I frame.

Though the single frame encoded in the past has been used as the predictive frame in the encoding and decoding schemes of the system, the number of such frames is not limited to 1 but two or more predictive frames (prediction destinations) may be employed.

In specifications such as MPEG-2 or MPEG-4, there exists a conception that an image on a time axis at a future point earlier than an image to be encoded is treated as a B frame forming a predictive frame. In this example, the past image is used as the predictive frame and such a B frame is not used.

However, when predictive coding is carried out in units of a child frame as in this example, the B frame may also be used.

As has been explained above, in the image encoding device 1 or the image decoding device 2 in the present system, when it is desired to process, for example, motion picture data of a plurality of successive frames (parent frames), a frame (parent frame) of the image data to be encoded is divided into a plurality of child frames, the predictive coding system for encoding a frame based on the correlation between frames before and after the target frame is applied to the child frames, and data on the child frames are stored in the predictive frame memories 18 and 34.

Accordingly, when a parent frame is divided into 4 child frames for example, child frames having a resolution corresponding to ¼ of the resolution of the case of predictively coding a parent frame are only required to be stored in the predictive frame memories 18 and 34. As a result, even when it is desired to process a motion picture having, e.g., a high resolution, the capacity of the predictive frame memories 18 and 34 can be reduced and saved, thus realizing highly efficient processing operation.

In the image encoding device 1 of the present apparatus, the encoder input device has a function of receiving an image from the video input device 11, the frame divider 14 has a function of dividing a frame, the encoder has the function of the encoder 15 or the function of encoding controller 16, the encoder memory has a function of storing a reference frame decoded by the decoder 17 in the predictive frame memory 18, and the encoding output unit has the function of the communication controller 20. The processing device has such various types of functions.

In the image decoding device 2 of the apparatus, the decoder input device has the function of the communication controller 31, the decoder has the function of the decoder 33 or the function of the decoding controller 36, the decoder memory has the function of the predictive frame memory 34, the linker has the function of the frame linker 37, and the decoder output unit has a function of outputting an image to the video output device 39. The processing device has such various types of functions.

Embodiment 2

Explanation will be made as to a second embodiment of the present invention. Only different points of the second embodiment from the first embodiment are explained in detail, and explanation of other similar parts is omitted.

In the present embodiment, predictive coding operation is carried out based on an average image of child frames.

Figure 10:
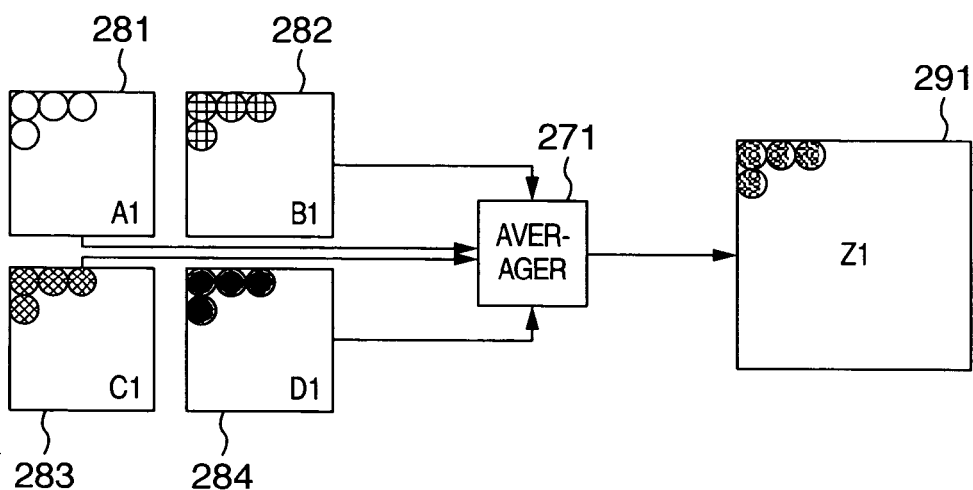
FIG. 10 shows an example of generating an average image of child frames in a second embodiment of the present invention.

FIG. 10 shows an example of how to generate an average image of child frames.

More specifically, with respect to 4 child frames 281 to 284 obtained by dividing the same parent frame, the values of pixels in the child frames at pixel positions are averaged by an averager 271 to obtain average values, and an image frame of pixels having the average values at pixel positions is generated as an average image 291 of the child frames 281 to 284.

The function of the averager 271 can be applied, for example, to the frame divider 14 or the encoder 15 in the image encoding device 1.

Figure 11:
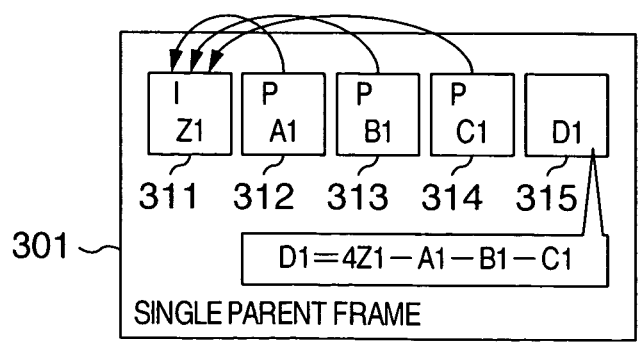
FIG. 11 shows an example of a frame encoding sequence.

FIG. 11 shows an example of a frame encoding sequence using an average image.

In this example, with regard to a single parent frame 301, a frame of an average image 311 is first encoded as an I frame, the frame of the average image 311 is set as a prediction reference destination (prediction destination), and subsequent 3 child frames 312, 313, and 314 are encoded as P frames respectively. As another example, with regard to the single parent frame 301, a frame of the average image 311 can be first encoded as an I frame, the frames 311, 312, and 313 previous thereto by one frame can be set as prediction reference destinations (prediction destinations) respectively, and the 3 child frames 312, 313, and 314 can be encoded as P frames respectively. In other words, the frame of the average image 311 may be set as the prediction destination of only the child frame 312, the prediction destination of the child frame 313 may be set as the child frame 312, and the prediction destination of the child frame 314 may be set as the child frame 313.

Since the remaining child frame 315 can be decoded with use of the frame of the decoded average image 311 and the other 3 child frames 312, 313, and 314 in the image decoding device 2, no encoding operation is carried out on the child frame 315 in the image encoding device 1 and thus the child frame 315 is not transmitted to the image decoding device 2. The function of decoding the remaining child frame 315 is applied, for example, to the decoder 33 of the image decoding device 2.

Even in this example, a frame encoding sequence similar to the frame encoding sequence shown, e.g., in FIG. 3A, 3B, 4, or 6 can be used. In this case, the I frame is limited preferably to the frame of the average image.

In the image encoding device 1 and the image decoding device 2 of the apparatus, since an average image Z1 is obtained by calculating an average value of pixels in an original image, the number of edge components between pixels can be made small and thus an image having less harmonic component can be generated. As a result, the image can be encoded more easily than child frames A1, B1, C1, and D1 made of pixels extracted from the corresponding pixel positions in the parent frame, and can have an encoding efficiency higher than such child frames A1, B1, C1, and D1.

When it is desired to encode the child frames A1, B1, and C1 with use of the average image Z1 as the reference frame, pixels at pixel positions of the child frames A1, B1, and C1 can be predicted from the average image Z1, for example, by the motion vector search of decimal pixel accuracy used in the H. 264 coding system (Standard ISO/IEC 14496-10). Thus, a prediction accuracy can be increased and a high encoding efficiency can be obtained. Even when an average image is not generated, pixels at pixel positions in the child frames A1, B1, and C1 can be predicted.

Embodiment 3

Explanation will next be made as to a third embodiment of the present invention.

Points of the present embodiment different from the first embodiment will be explained in detail, and similar parts thereof are omitted.

In this example, a frame to be encoded is repetitively divided and encoded.

Figure 12:
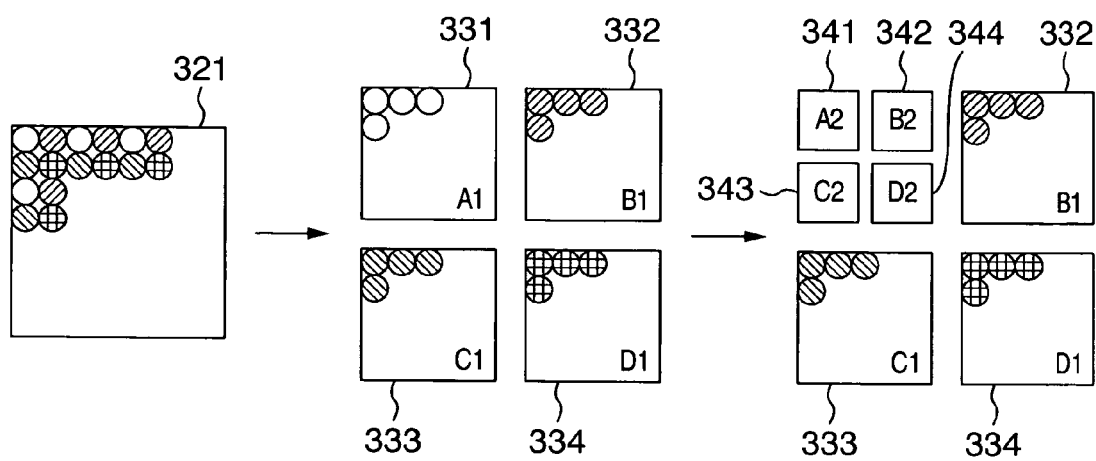
FIG. 12 shows an example of a frame division system in accordance with a third embodiment of the present invention.

FIG. 12 shows an example of a scheme of dividing a frame by the frame divider 14. In this example, a parent frame 321 is divided into 4 parent frames 331, 332, 333, and 334, and further one 331 of the child frames is divided into a grandchild frames 341, 342, 343, and 344.

In the encoding operation, the finely-divided grandchild frames 341 to 344 are first encoded. In this example, one (A2) 341 of the 4 grandchild frames located at an upper left side is encoded as an I frame, and the other grandchild frames (B2, C2, and D2) 342, 343, and 344 are encoded with use of the grandchild frame 341 as a reference frame. The child frame 331 can be rearranged by decoding these 4 grandchild frames 341 to 344, the other child frames (B1, C1, and D1), 332, 333, and 334 are encoded with use of the child frame (A1) 331 as a reference frame. The image encoding device 1 transmits encoded images about the 4 grandchild frames 341 to 344 as the divisions of the one child frame 331 as well as encoded images about the other child frames 332 to 334 to the image decoding device 2.

Figure 13:
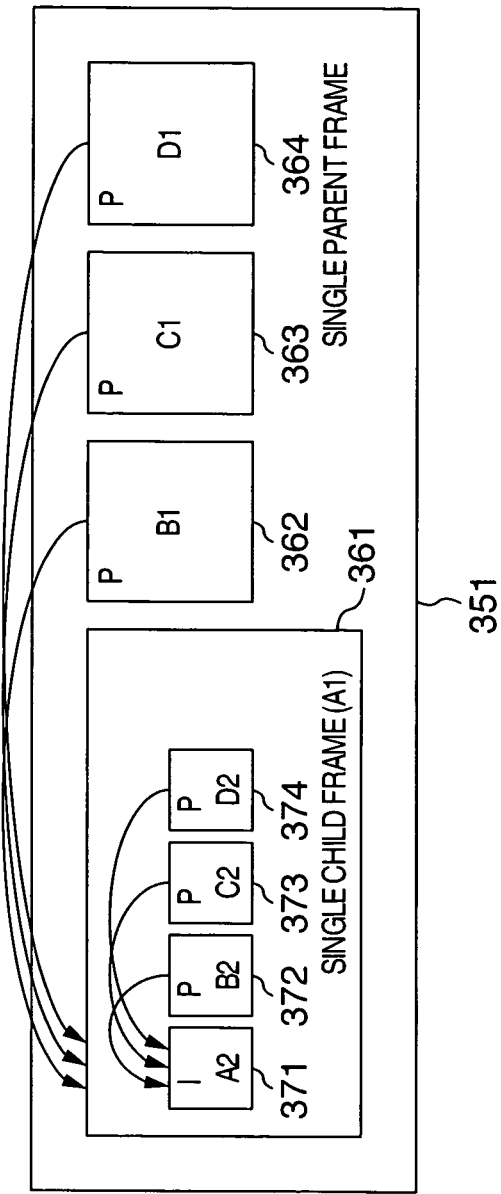
FIG. 13 shows another example of the frame encoding sequence.
Figure 14:
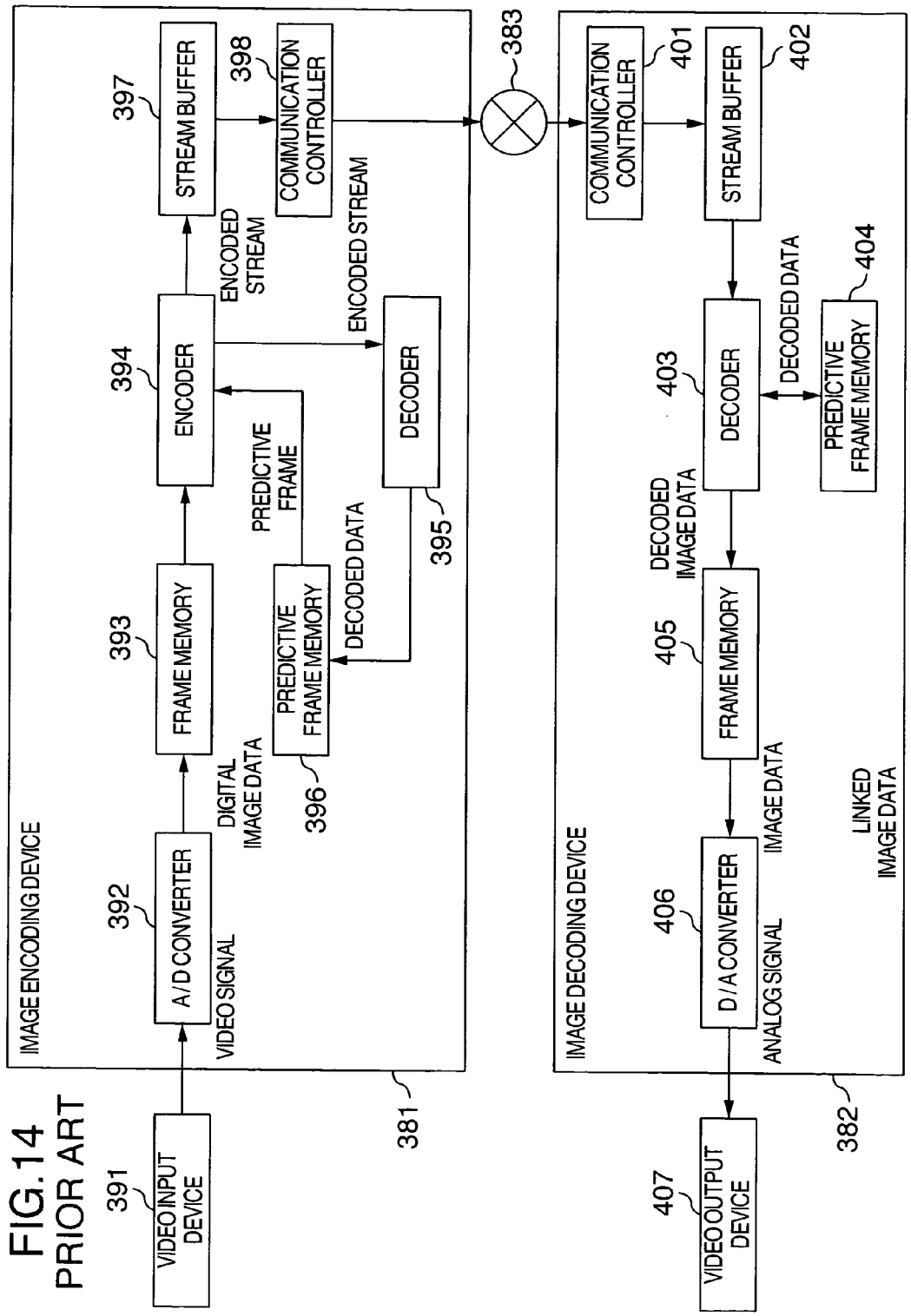
FIG. 14 shows an example of a prior art image transmission system.

FIG. 13 shows an example of a sequence of encoding child and grandchild frames when a parent frame is encoded.

In this example, with respect to a single parent frame 351, one 371 of 4 grandchild frames 371 to 374 obtained by dividing a single child frame 361 is encoded as an I frame; the second, third, and fourth grandchild frames 372, 373, and 374 are encoded as P frames with use of the grandchild frame 371 as a prediction destination; second, third, and fourth child frames 362, 363, and 364 are encoded as P frames with use of the first child frame 361 as a prediction destination.

When such encoded data is decoded, the grandchild frame 371 of the group of grandchild frames as the prediction destination is first decoded, and the remaining grandchild frames 372, 373, and 374 are decoded with use of the decoded grandchild frame 371 as a reference frame. When all the grandchild frames 371 to 374 are decoded, the child frame 361 is rearranged from the grandchild frames 371 to 374, and the remaining child frames 362, 363, and 364 are decoded with use of the child frame 361 as a reference frame.

In the image encoding device 1 or the image decoding device 2 of the present apparatus, decoded images having the respective optimum sizes can be obtained by a group of image decoding devices (a plurality of image decoding devices) having various sorts of decoding functions respectively.

For example, when it is desired to encode an image having a large size (e.g., 4096 pixels×2048 pixels) such as a digital cinema and even when a parent frame is divided into child frames, the image size of the child frame is higher than the resolution of a standard TV image. In such a case, an image decoding device having a low processing capability cannot decode even a single child frame within a predetermined processing time, or such an image decoding device cannot reserve a frame memory corresponding to the child frame.

In the arrangement of the present apparatus, on the other hand, when the image decoding device 2 decodes a single grandchild frame, images decoded by dividing an original image into 16 samples (by dividing the original by 4 vertical and horizontal lines into 16 samples) can be obtained. When an image decoding device has a low decoding capability, a motion picture having a low resolution can be reproduced by decoding only a grandchild frame. When an image decoding device has a sufficient decoding capability, a decoded image having a higher resolution can be reproduced according to the processing capability by further decoding the remaining grandchild frames or child frames.

The arrangement of the apparatus can be applied suitably to, for example, such a system that, with regard to a single encoded stream, a cellular telephone terminal device or the like decodes and reproduces only a grandchild frame and a high-resolution monitor or the like decodes and reproduces an image having a resolution as high as the original image. In this case, the image encoding device 1 may also be arranged, for example, so as to transmit the encoded image of a single grandchild frame (I frame) to a cellular telephone terminal device or the like. The cellular telephone terminal device or the like can be arranged so as not to receive an unnecessary encoded image by performing abortion control on the decoding operation.

Although explanation has been made in connection with the case where a parent frame is divided into child frames and each child frame is further divided into grandchild frames in this example, such an arrangement as to repetitively divide a grandchild frame further into smaller frames is also possible.

The arrangement or structure of the system or apparatus of the present invention is not limited to the aforementioned example but may be modified in various ways. The present invention can be provided, for example, in the form of a method or system of executing the processing operation of the invention, a program for implementing the method or system, or a recording medium for recording such a program therein; or may also be provided as various sorts of apparatuses or systems.

The application field of the present invention is not always limited to the above examples but the present invention can be applied to various types of fields.

The various operations of the system or apparatus of the present invention may be controlled, for example, by a processor which executes a control program stored in a ROM (Read Only Memory) in a hardware resource having the processor or the memory, or various function means for executing the various operations may be arranged, for example, as independent hardware circuits respectively.

The present invention can also be implemented in the form of a recording medium readable by a computer such as a floppy (registered trademark) disk or a CD (Compact Disk)-ROM having the control program stored therein or in the form of the control program per se. In the latter case, the operation of the present invention can be realized by inputting the control program to a computer from the recording medium to cause the processor to execute the program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing system for encoding an image by an image encoding device and decoding the encoded image by an image decoding device, said image encoding device comprising:
    an encoder input unit for inputting the image to be processed;
    a divider for dividing a frame of the image inputted from said encoder input unit as a parent frame into a plurality of child frames;
    an encoder for encoding each of the child frames generated by said divider in an intra-child-frame correlation system or in an inter-child-frame correlation system;
    an encoder memory for storing a reference frame when the inter-child-frame correlation system is used; and
    an encoder output unit for outputting the image encoded by said encoder,
    said image decoding device comprising:
    a decoder input unit for inputting the encoded image;
    a decoder for decoding the child frames on the basis of the encoded image input from said decoder input unit in a system compatible with the system used in encoding;
    a decoder memory for storing the reference frame when the inter-child-frame correlation system is used;
    a linker for linking the child frames decoded by said decoder to generate a parent frame;
    a decoder output unit for outputting an image of the parent frame generated by said linker; and
    wherein said encoder, in a child frame encoding operation for each parent frame, is controlled to abort the encoding operation of the child frame exceeding a predetermined frame refreshing period allocated to each parent frame, and said decoder, in a child frame decoding operation for each parent frame, is controlled to abort the decoding operation of the child frame exceeding a predetermined output refreshing time allocated to each parent frame.

2. A video encoding method for compressing and encoding video in digital data, the method comprising:
    storing at least one frame of video data into memory as a parent frame,
    wherein the parent frame includes a plurality of adjacent pixels, each of the pixels having a positional relationship identified by a unique coordinate point, the unique coordinate point including a first pixel position in a width direction and a second pixel position in a height direction,
    dividing the parent frame into at least four child frames in such a way that each of the pixels is arranged in a respective child frame while maintaining the same positional relationship identified by the unique coordinate point in the parent frame;
    encoding a first child frame or an average child frame of the plurality of child frames without referring to other child frames belonging to the same parent frame;
    decoding the first child frame or the average child frame for use of prediction; and
    prediction encoding the other child frames based on an inter-child-frame prediction by referring to a preceding child frame which has been encoded and decoded.

3. A video encoding method according to claim 2 further comprising:
    prediction decoding the other child frames for the use of prediction; and
    outputting a encoded stream wherein the plurality of encoded child frames and frame header of those are allocated successively and each frame header includes information of corresponding parent frame number and child frame number,
    wherein, in the encoding step, the first child frame or the average child frame is encoded in basis of intra encoding; and
    in the prediction encoding step, all the other child frames are encoded by referring to the decoded first child frame or the average child frame belonging to the same parent frame or a prior parent frame.

4. A video encoding method according to claim 2,
    wherein, when processing subsequent frames of the video data as parent frames, in the encoding step, the first child frame is encoded in basis of inter encoding by referring to a first or last child frame belonging to a precedence parent frame.

5. A video encoding method according to claim 2, further comprising:
    in a child frame encoding operation for each parent frame, aborting the encoding operation of a child frame exceeding a predetermined frame refreshing period allocated to each parent frame; and
    in a child frame decoding operation for each parent frame, aborting the decoding operation of a child frame exceeding a predetermined output refreshing time allocated to each parent frame.

* * * * *